US 9,253,967 B2

(12) United States Patent
Davis

(10) Patent No.: US 9,253,967 B2
(45) Date of Patent: *Feb. 9, 2016

(54) SNAG-RESISTANT FISHING LURE AND METHODS OF MAKING AND USING

(75) Inventor: James Ronald Davis, Rock Hill, SC (US)

(73) Assignee: Holding One, Inc., Charleston, SC (US)

( * ) Notice: Subject to any disclaimer, the term of this patent is extended or adjusted under 35 U.S.C. 154(b) by 499 days.

This patent is subject to a terminal disclaimer.

(21) Appl. No.: 12/762,826

(22) Filed: Apr. 19, 2010

(65) Prior Publication Data

US 2010/0199542 A1    Aug. 12, 2010

Related U.S. Application Data

(63) Continuation of application No. 11/735,520, filed on Apr. 16, 2007, now Pat. No. 7,726,062, which is a continuation of application No. 10/947,324, filed on Sep. 23, 2004, now Pat. No. 7,627,978.

(60) Provisional application No. 60/556,240, filed on Mar. 25, 2004.

(51) Int. Cl.
| A01K 85/00 | (2006.01) |
| A01K 85/18 | (2006.01) |
| A01K 85/14 | (2006.01) |
| A01K 85/02 | (2006.01) |

(52) U.S. Cl.
CPC .............. *A01K 85/14* (2013.01); *A01K 85/00* (2013.01); *A01K 85/02* (2013.01); *A01K 85/18* (2013.01)

(58) Field of Classification Search
CPC ....... A01K 85/00; A01K 85/14; A01K 85/16; A01K 85/18

USPC ............ 43/42.47, 42.39, 42.22, 42.23, 42.24, 43/42.28, 42.15, 42.18, 42.4, 42.42, 42.49, 43/42.5, 42.52, 42.03
See application file for complete search history.

(56) References Cited

U.S. PATENT DOCUMENTS

| 1,297,617 | A | * | 3/1919 | Welles ......................... 43/42.15 |
| 1,333,154 | A | * | 3/1920 | Buddle ......................... 43/42.47 |
| 1,418,229 | A | * | 5/1922 | Buddle ......................... 43/42.23 |
| 1,421,991 | A | * | 7/1922 | Rodgers et al. .............. 43/42.18 |

(Continued)

FOREIGN PATENT DOCUMENTS

| DE | 3718019 C1 * | 9/1988 | ............. A01K 85/00 |
| FR | 2652991 A1 * | 4/1991 | ............. A01K 85/18 |

(Continued)

*Primary Examiner* — Darren W Ark
(74) *Attorney, Agent, or Firm* — Timothy D. St. Clair; Nexsen Pruet, LLC

(57) ABSTRACT

The snag-resistant fishing lure is designed to minimize the chances of the lure becoming ensnared. The lure has a jig and a blade attached to the blade in a configuration that limits the side-to-side movement of the blade, thereby preventing the jig from rolling to a hook-downward position prone to snagging. A centrally aligned hole is positioned close to the front edge of the blade member. An eyelet extending from the jig body is attached through an aperture in the blade. The blade is limited in its side-to-side movement by contact between the blade edge and either the jig body or the eyelet. The limited side-to-side movement of the blade creates a quick, controlled, oscillating blade action that imparts a natural swimming motion to the lure, emulating prey species movements.

20 Claims, 9 Drawing Sheets

(56) References Cited

U.S. PATENT DOCUMENTS

| | | | | |
|---|---|---|---|---|
| 1,644,151 A * | 10/1927 | Rodgers | | 43/42.47 |
| 1,833,581 A * | 11/1931 | Jordan | | 43/42.49 |
| 1,910,742 A | 5/1933 | Binns | | |
| 1,934,158 A * | 11/1933 | Yarvice | | 43/42.15 |
| 1,994,678 A * | 3/1935 | Yarvise | | 43/42.15 |
| 1,997,900 A * | 4/1935 | Edwards | | 43/42.15 |
| 2,032,819 A * | 3/1936 | Tengel | | 43/42.18 |
| 2,051,978 A | 8/1936 | Accetta | | |
| 2,119,805 A * | 6/1938 | Davenport | | 43/42.52 |
| 2,246,850 A * | 6/1941 | Housberg | | 43/42.39 |
| 2,291,422 A * | 7/1942 | Thomas | | 43/42.18 |
| 2,463,889 A | 3/1949 | Lundemo | | |
| 2,507,908 A * | 5/1950 | Kaste | | 43/42.03 |
| 2,523,536 A * | 9/1950 | Maddux | | 43/42.03 |
| 2,523,949 A * | 9/1950 | Gambill | | 43/42.47 |
| 2,555,435 A * | 6/1951 | Caen | | 43/42.15 |
| 2,559,542 A * | 7/1951 | Mintner | | 43/42.15 |
| 2,588,055 A * | 3/1952 | Smith | | 43/42.15 |
| 2,693,048 A * | 11/1954 | Ansley | | 43/42.47 |
| 2,700,240 A * | 1/1955 | Gibbs | | 43/42.52 |
| 2,714,273 A * | 8/1955 | Torrance | | 43/42.18 |
| 2,799,113 A * | 7/1957 | Gonzales | | 43/42.18 |
| 2,799,133 A | 7/1957 | Gonzales | | |
| 2,805,512 A * | 9/1957 | Bunce | | 43/42.18 |
| 2,817,921 A * | 12/1957 | Czesnocha | | 43/42.18 |
| 2,851,815 A * | 9/1958 | Warner | | 43/42.5 |
| 2,886,914 A * | 5/1959 | Lievense | | 43/42.39 |
| 2,948,984 A * | 8/1960 | Crawford | | 43/42.39 |
| 2,989,817 A * | 6/1961 | Kepler | | 43/42.39 |
| 3,012,356 A * | 12/1961 | Tyson | | 43/42.24 |
| 3,040,466 A * | 6/1962 | Jablonski | | 43/42.49 |
| 3,128,572 A * | 4/1964 | McVay | | 43/42.28 |
| 3,131,504 A * | 5/1964 | Haulk | | 43/42.39 |
| 3,187,457 A * | 6/1965 | Karisch | | 43/42.47 |
| 3,192,660 A * | 7/1965 | Guess | | 43/42.49 |
| 3,229,407 A * | 1/1966 | Quyle | | 43/42.18 |
| 3,248,820 A * | 5/1966 | Lamar | | 43/42.39 |
| 3,293,790 A * | 12/1966 | Konomos | | 43/42.15 |
| 3,344,549 A * | 10/1967 | Peters et al. | | 43/42.47 |
| 3,405,475 A * | 10/1968 | Ross | | 43/42.18 |
| 3,541,718 A * | 11/1970 | Norman | | 43/42.47 |
| 3,579,892 A * | 5/1971 | Olvey, Sr. | | 43/42.28 |
| 3,729,850 A * | 5/1973 | Waters, Jr. | | 43/42.47 |
| 3,731,419 A * | 5/1973 | Candy | | 43/42.28 |
| 3,753,310 A * | 8/1973 | Werner | | 43/42.39 |
| 3,902,267 A * | 9/1975 | Monchil | | 43/42.47 |
| 4,035,945 A * | 7/1977 | Newman | | 43/42.15 |
| 4,044,491 A * | 8/1977 | Potter | | 43/42.39 |
| 4,142,318 A * | 3/1979 | Morrell | | 43/42.5 |
| 4,142,319 A * | 3/1979 | Mihaljevic | | 43/42.39 |
| 4,320,592 A * | 3/1982 | Kirsch | | 43/42.39 |
| 4,453,333 A * | 6/1984 | Olson | | 43/42.5 |
| 4,641,455 A * | 2/1987 | Johnson | | 43/42.5 |
| 4,658,535 A * | 4/1987 | Anderson | | 43/42.5 |
| 4,660,318 A * | 4/1987 | Mieno | | 43/42.39 |
| 4,738,047 A * | 4/1988 | Ryan | | 43/42.47 |
| 4,747,228 A * | 5/1988 | Giovengo, Jr. | | 43/42.42 |
| 4,769,940 A * | 9/1988 | Doss | | 43/42.5 |
| 4,773,180 A * | 9/1988 | Shimizu | | 43/42.47 |
| 4,777,761 A * | 10/1988 | Renaud | | 43/42.47 |
| 4,815,229 A * | 3/1989 | Nicholson, III | | 43/42.47 |
| 4,862,629 A * | 9/1989 | Ryan | | 43/42.47 |
| 4,864,766 A * | 9/1989 | Bohn | | 43/42.39 |
| 5,113,615 A | 5/1992 | Drachkovitch | | |
| 5,150,538 A * | 9/1992 | Buchanan | | 43/42.39 |
| 5,157,859 A * | 10/1992 | Wirkus | | 43/42.52 |
| 5,216,830 A * | 6/1993 | Brott, II | | 43/42.39 |
| 5,337,508 A * | 8/1994 | Pfeiffer | | 43/42.22 |
| 5,461,819 A * | 10/1995 | Shindledecker | | 43/42.39 |
| 5,822,914 A * | 10/1998 | Tadych | | 43/42.39 |
| 5,857,283 A * | 1/1999 | Perrick | | 43/42.5 |
| 5,887,378 A * | 3/1999 | Rhoten | | 43/42.5 |
| 5,918,406 A * | 7/1999 | Wilson | | 43/42.15 |
| 5,937,569 A * | 8/1999 | Solheim et al. | | 43/42.47 |
| 5,974,723 A | 11/1999 | Taibi | | |
| 5,983,554 A * | 11/1999 | Storey | | 43/42.42 |
| 6,269,583 B1 * | 8/2001 | Tashchyan | | 43/42.5 |
| 6,484,434 B1 * | 11/2002 | Elges | | 43/42.47 |
| 6,581,321 B2 * | 6/2003 | Tashchyan | | 43/42.39 |
| 6,618,979 B2 * | 9/2003 | Wacha | | 43/42.47 |
| 6,772,553 B2 * | 8/2004 | Phillips et al. | | 43/42.39 |
| 6,813,857 B2 * | 11/2004 | Payer | | 43/42.39 |
| 7,028,430 B2 * | 4/2006 | Gironda | | 43/42.39 |
| 7,107,718 B1 * | 9/2006 | Alajajyan | | 43/42.39 |
| 7,197,846 B1 * | 4/2007 | Gibson | | 43/42.5 |
| 7,493,724 B1 * | 2/2009 | Peterson | | 43/42.03 |
| 7,621,068 B1 * | 11/2009 | Renosky | | 43/42.15 |
| 7,627,978 B2 * | 12/2009 | Davis | | 43/42.15 |
| 7,726,062 B2 * | 6/2010 | Davis | | 43/42.15 |
| 8,656,633 B2 * | 2/2014 | Renosky | | 43/42.39 |
| 8,739,460 B2 * | 6/2014 | Thorne | | A01K 85/00 43/42.15 |
| 8,919,033 B2 * | 12/2014 | Davis | | A01K 85/02 43/42.03 |
| 8,973,298 B2 * | 3/2015 | Thorne | | A01K 85/00 43/42.15 |
| 2001/0045048 A1 * | 11/2001 | Johnson | | 43/42.39 |
| 2003/0074830 A1 * | 4/2003 | Goeke | | 43/42.39 |
| 2005/0086849 A1 * | 4/2005 | Perrick | | 43/42.47 |
| 2005/0246940 A1 * | 11/2005 | Jones et al. | | 43/42.5 |
| 2006/0053680 A1 * | 3/2006 | Petitjean | | 43/42.47 |
| 2006/0191186 A1 * | 8/2006 | Perrick | | 43/42.47 |
| 2008/0172924 A1 * | 7/2008 | Thorne | | 43/42.47 |
| 2008/0263935 A1 * | 10/2008 | Albrecht et al. | | 43/42.47 |
| 2009/0183418 A1 * | 7/2009 | Dahlberg | | 43/42.47 |
| 2009/0211145 A1 * | 8/2009 | Thorne | | 43/42.39 |
| 2013/0047491 A1 * | 2/2013 | Davis | | 43/42.49 |
| 2015/0007483 A1 * | 1/2015 | Thorne | | A01K 85/16 43/42.03 |

FOREIGN PATENT DOCUMENTS

| | | | | |
|---|---|---|---|---|
| JP | 11-235137 A | | 8/1999 | |
| JP | 11235137 A | * | 8/1999 | A01K 85/00 |
| JP | 2001120114 A | * | 5/2001 | A01K 85/00 |
| JP | 2003134969 A | * | 5/2003 | A01K 85/00 |
| JP | 2004049123 A | * | 2/2004 | A01K 85/00 |
| JP | 2005198511 A | * | 7/2005 | A01K 85/00 |

* cited by examiner

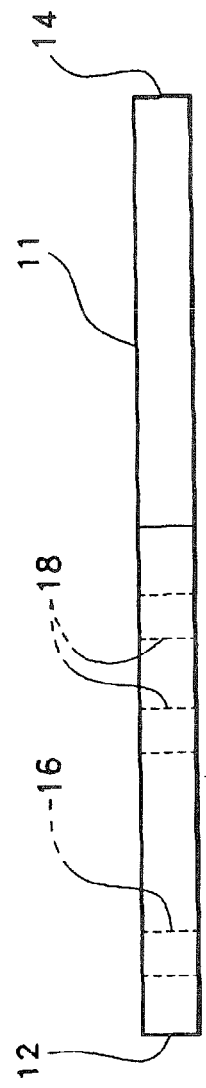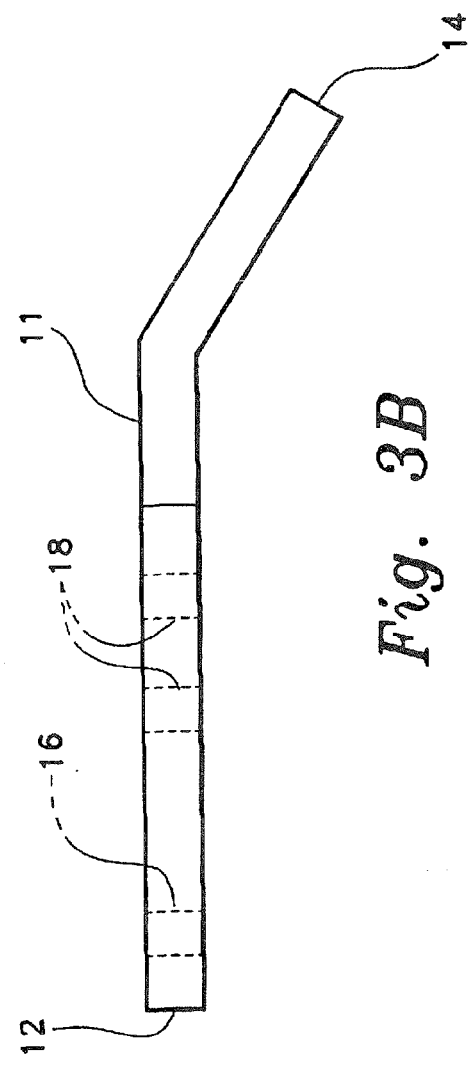

SNAG-RESISTANT FISHING LURE AND METHODS OF MAKING AND USING

CROSS-REFERENCE TO RELATED APPLICATIONS

This application is a continuation application, claiming priority to U.S. patent application Ser. No. 11/735,520, filed Apr. 16, 2007, now U.S. Pat. No. 7,726,062 which is a continuation of U.S. patent application Ser. No. 10/947,324, filed Sep. 23, 2004 and issued Dec. 8, 2009, as U.S. Pat. No. 7,627,978, which claims the benefit of U.S. Provisional Patent Application No. 60/556,240, filed Mar. 25, 2004, the disclosures of these applications being incorporated by reference herein.

BACKGROUND OF THE INVENTION

1. Field of the Invention

The present invention relates to fishing lures. More particularly, the invention is a snag-resistant fishing lure having a blade member uniquely attached to a weighted jig body to substantially minimize the risk of losing the lure to an underwater snag and to provide an intense vibrating action as movement through water displaces the blade from side to side. The present fishing lure may be configured to dive or to run toward the water surface on retrieval by varying the position on the blade member where the fishing line is attached.

2. Description of the Related Art

Losing a fishing lure to a snag is a common risk faced by virtually all sport fishermen. Numerous jigs are designed to create a high degree of snag-resistance by molding fiber or wire "weed-guards" in front of the hook. Weed-guards effectively lessen the number of snags, but at the expense of lessening the chances of hooking a fish when the fish strikes because the wire weed guard interferes with the fish taking the hook. The fish must first bite through the weed guard, and the pressure against the fish's mouth may be felt by the fish and discourage the fish from taking the hook.

In addition to snag-resistance, it is desirable for a fishing jig to include a blade or other feature to create motion, and to reflect light, to give the jig a simulated natural swimming motion resembling a minnow or other food source for the sport fish being sought. While many jigs are designed to attract fish in novel ways, none achieve a controlled vibrating action or address the problem of snagging without the aid of weed-guards in front of the hook point. There is a need for a lure that includes features pertaining to snag avoidance without clumsy weed guards, and which also produces an underwater movement that is attractive to fish.

U.S. Pat. No. 5,974,723, issued on Nov. 2, 1999 to J. Taibi, illustrates a weed shielding spinner type fishing lure that incorporates a wire weed guard to prevent snagging of the lure.

U.S. Pat. No. 5,857,283, issued Apr. 7, 1997 to J. D. Perrick, discloses a fishing lure including a blade having edges that, beginning at the rear edge and going toward the front edge, first converge then diverge towards a blunt, rounded front point, with a hook dressed with feathers, winding thread or the like attached to a rounded rear edge of the blade. The blade includes a slight bend at the rear edge and a slight bend at the front edge, both bends contributing to causing a more life-like motion in the movements of the lure as it is retrieved.

U.S. Pat. No. 2,463,889, issued Mar. 8, 1949 to A. C. Lundemo, describes a fishing lure including an elongated spoon having a flat portion, an intermediate portion and a concave portion. A hook is attached to the concave portion and a staple passes through the intermediate portion for the purpose of connecting to a line. The shape of the elongated spoon causes the lure to move in a sporadic and random fashion, as opposed to a rhythmic pattern.

U.S. Pat. No. 2,948,984, issued Aug. 16, 1960 to W. Crawford, discloses a fishing lure including a concave spoon having a weighted plug attached to one end and a hook attached to the other end. The spoon also has two holes centrally and longitudinally aligned for the purpose of attaching the lure to a line. The shape of the spoon causes the lure to vibrate depending on the speed of retrieval, thereby attracting fish.

Other related patents pertaining to fishing lures include U.S. Pat. No. 1,910,742, issued May 23, 1933 to E. H. Binns (fishing lure including concave spoon and dressed hook attached); U.S. Pat. No. 2,051,978, issued Aug. 25, 1936 to A. C. Accetta (fishing lure including a concave spoon, hook, and fins); and U.S. Pat. No. 5,113,615, issued May 19, 1992 to A. Drachkovitch (spinning spoon fishing lure, including a blade mounted on a swivel and a flexible shaft having hooks attached).

None of the above inventions and patents, taken either singly or in combination, is seen to describe the instant invention as claimed. Thus, a snag-resistant fishing lure solving the aforementioned problems is desired.

SUMMARY OF THE INVENTION

The snag-resistant fishing lure comprises a blade member uniquely attached to a weighted jig body to substantially minimize the risk of losing the lure to an underwater snag and to provide an intense vibrating action as movement through water displaces the blade from side to side.

The jig itself is a generally conventional jig, comprising a weighted body with a fishing hook extending rearward, and an eyelet extending forward. Such a conventional jig is often made by simply casting the weighted body onto the shank of a fishing hook, with the fishing hook eyelet or a separate eyelet piece extending from the front of the weighted body and the hook portion extending rearward.

A centrally aligned hole is positioned close to the front edge of the blade member. The jig eyelet is attached to the blade member through the hole with the hook facing upward. The size of the hole and the proximity of the jig's weighted head to the flat edge keep the hook facing upward, even upon contact with an underwater obstacle. Additionally, the blade is limited in its side-to-side movement by contact between the blade edge and either the jig body or the eyelet. The limited side-to-side movement of the blade creates a quick, controlled, oscillating blade action that imparts a natural swimming motion to the lure, emulating prey species movements.

The snag-resistant fishing lure's blade and weighted jig configuration prevents the hook from rolling downward toward potential snagging obstacles on the bottom. The jig hook is maintained in an upright position by the blade during retrieval.

In a conventional jig, the head of the jig tends to hit an underwater obstruction first, causing the hook to rotate and snag the obstruction. With the present invention, the hook pivots upward when the jig's head contacts a snag because of the unique coupling mechanism between the blade and the jig. It is not allowed to roll because of the blade's elongated front edge and the proximity of the jig body to the front edge of the blade. Such features greatly reduce the chances of snagging.

These and other features of the present invention will become readily apparent upon further review of the following specification and drawings.

BRIEF DESCRIPTION OF THE DRAWINGS

FIG. 3A is a side view of a blade for the fishing lure of the present invention.

FIG. 3B is a side view of a blade for the fishing lure of the present invention, the blade being bent to alter the vibrating action of the blade.

Similar reference characters denote corresponding features consistently throughout the attached drawings.

DETAILED DESCRIPTION OF THE PREFERRED EMBODIMENTS

Figure 1:
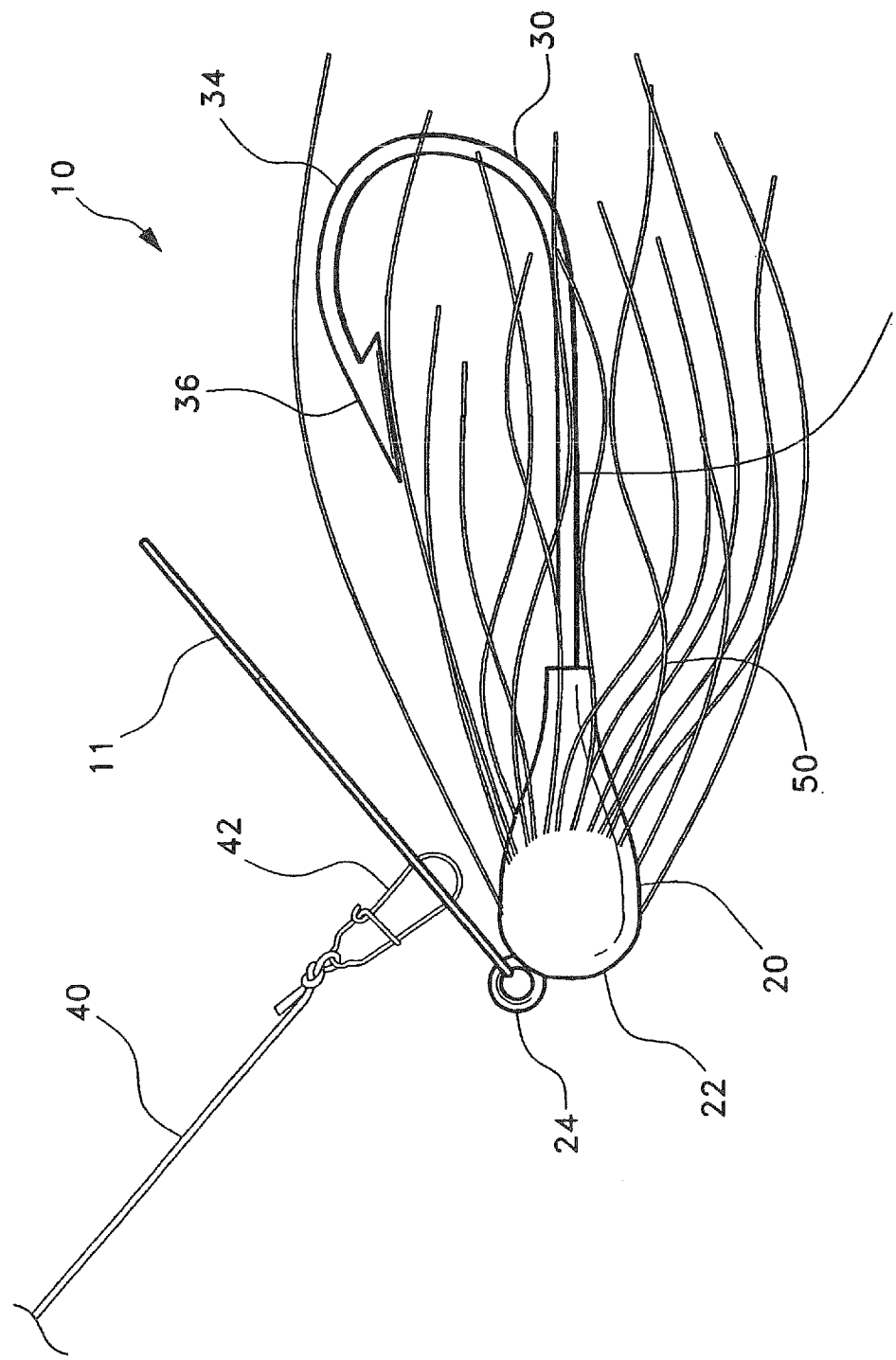
FIG. 1 is a perspective view of a snag-resistant fishing lure according to the present invention.

The present invention is a snag-resistant fishing lure, designated generally as 10 in the drawings. Referring to FIG. 1, the fishing lure 10 comprises a blade 11 and a jig 20, the blade 11 being attached to the jig 20 in a special configuration whereby the risk of losing the lure to an underwater snag is substantially minimized, and a vibrating action is created as movement of the fishing lure 10 through water displaces the blade 11 from side to side relative to the jig 20.

The jig 20 comprises a fishhook 30 and a jig body 22, there being an eyelet 24 extending from the jig body 22. The fishhook 30 has a shank 32, and a hook end 34, the hook end 34 terminating in a barbed point 36. The jig body 22 is molded around the shank 32 of the fishhook 30. The eyelet 24 preferably extends from a front upper area of the jig body 22. The eyelet 24 comprises a wire loop. Considering the hook end 34 of the fishhook 30 to define a plane, the eyelet 24 is generally coplanar to the hook end 34. The blade 11 is attached to the eyelet 24 protruding from the jig body 22. A fishing line 40 is connected to the blade 11 by a snap fastener 42.

In use, the fishing lure 10 is pulled through the water by the fishing line 40. The blade 11 may either be swept rearward over the jig 20, as shown in FIG. 1, or may be pulled ahead of the jig 20, depending on the configuration of the blade 11 as will be discussed more fully below.

The fishing lure 10 may be dressed, such as with a skirt 50, to disguise the lure 10 as an insect, an underwater creature, or in any way desirable to the fisherman.

Figure 2A:
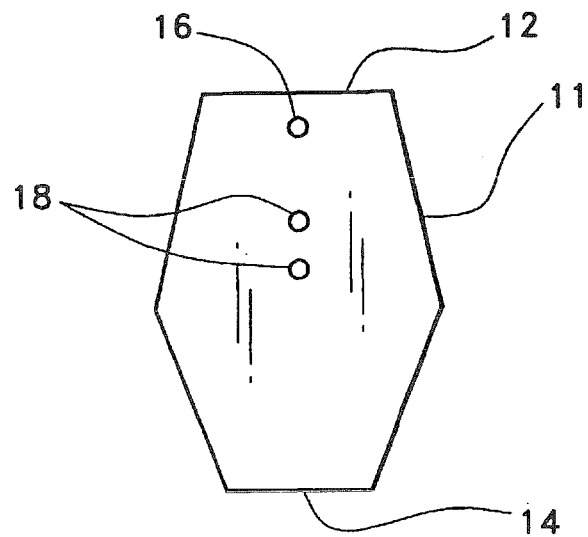
FIG. 2A is a plan view of a first embodiment of a blade for the fishing lure of the present invention.
Figure 2B:
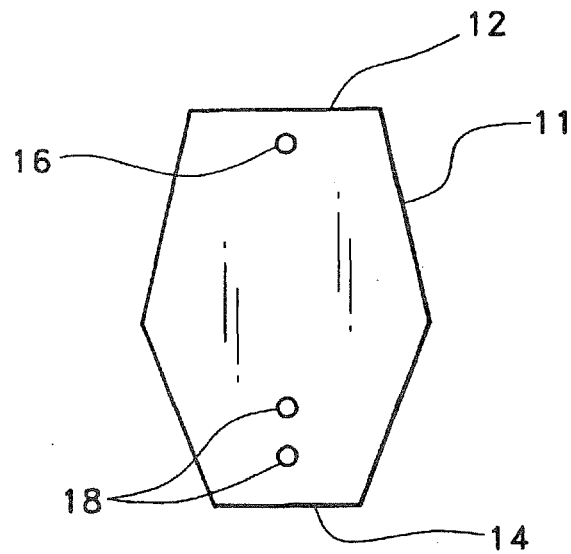
FIG. 2B is a plan view of a second embodiment of a blade for the fishing lure of the present invention.

Referring to FIGS. 2A and 2B, the blade 11 is shown as a generally polygonal flat blade member, constructed of a flat sheet metal, such as stainless steel, brass or the like. Other materials, such as plastic, are also suitable for the blade 11.

As seen in FIGS. 2A and 2B, the blade 11 has an elongated hexagonal shape having a first end 12 and a second end 14. The first end 12 has a flat or linear edge of a width approximate to the width of the jig body 22, although the width may vary. The first end 12 is attached to the jig 20 by means of a mounting hole 16 centered along the first end 12. The blade 11 is configured for attachment of a fishing line to the blade 11. In the present embodiment, the blade 11 includes a pair of line attachment holes 18 that are punched through the blade 11 to receive a snap fastener 42 for attachment of a fishing line 40. The line attachment holes 18 are located along the blade's longitudinal axis, and are spaced apart to accept the snap fastener 42.

Figure 2C:
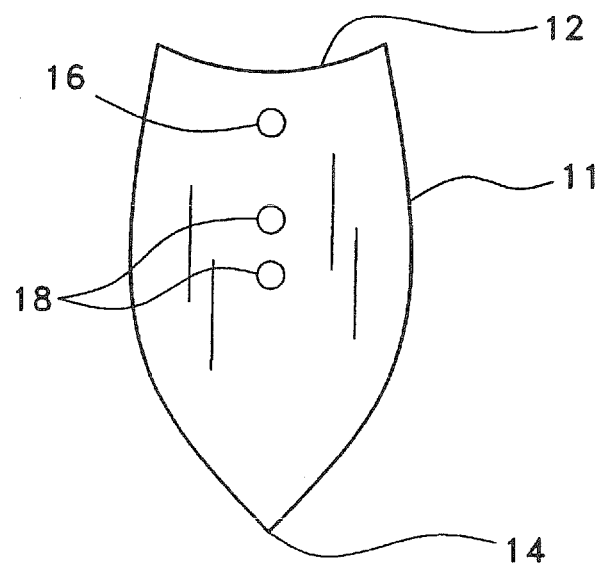
FIG. 2C is a plan view of an alternative shape of a blade for the fishing lure of the present invention.
Figure 2D:
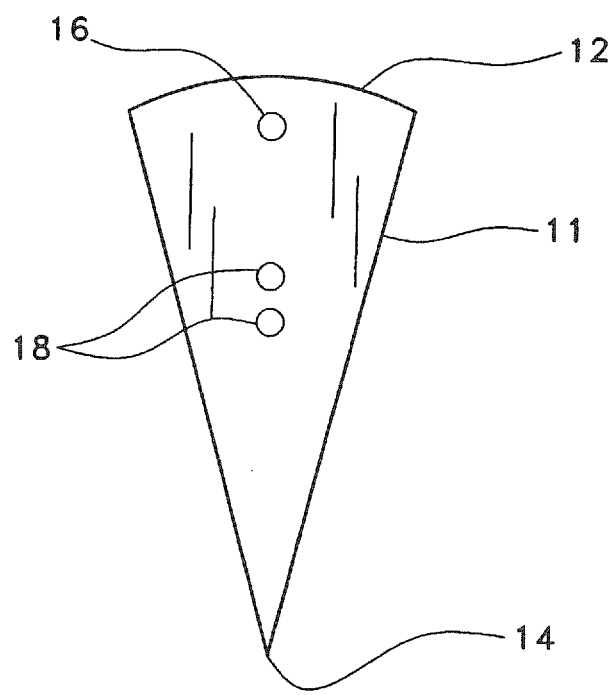
FIG. 2D is a plan view of an alternative shape of a blade for the fishing lure of the present invention.

The location of the line attachment holes 18 along the blade's longitudinal axis has a significant effect on the behavior of the fishing lure 10. With the line attachment holes 18 located proximate to the first end 12 and the mounting hole 16, as shown in FIG. 2A, the lure 10 will tend to dive on retrieval, as will be discussed below. Conversely, with the attachment holes 18 located proximate to the second end 14 away from the mounting hole 16, as shown in FIG. 2B, the lure 10 will tend to run toward the water surface on retrieval. Turning now to FIGS. 2C and 2D, it can be appreciated that the blade 11 may have a variety of shapes. The first end 12 (the end attached closest to the jig body 22) may be concave, as seen in FIG. 2C, or convex, as seen in FIG. 2D. The blade 11 may have rounded edges, as seen in FIG. 2C, rather than a polygonal shape, and may have fewer linear edges than the blade of FIGS. 2A and 2B, as seen in FIG. 2D.

Turning now to FIGS. 3A and 3B, blade 11 is shown in exaggerated thickness for clarity. The profile of the blade 11 can be varied to affect the behavior of the snag-resistant fishing lure 10. FIG. 3A shows the blade 11 to be flat, while FIG. 3B shows the blade 11 having a bend near the second end 14 of the blade 11. Bending the blade 11 will decrease the effective surface area of the blade 11, decreasing the amount of drag the blade 11 presents as the fishing lure 10 is pulled through the water. It can be appreciated that varying the degree of drag will affect both the tendency of the snag resistant fishing lure 10 to dive or run to the surface, and the tendency of the blade 11 to oscillate from side to side of the snag-resistant fishing lure 10. Decreasing the surface area of the blade 11 has a stabilizing effect on the path of the lure 10, while increasing the surface area of the blade 11 causes the lure 10 to follow a more erratic path.

Figure 4A:
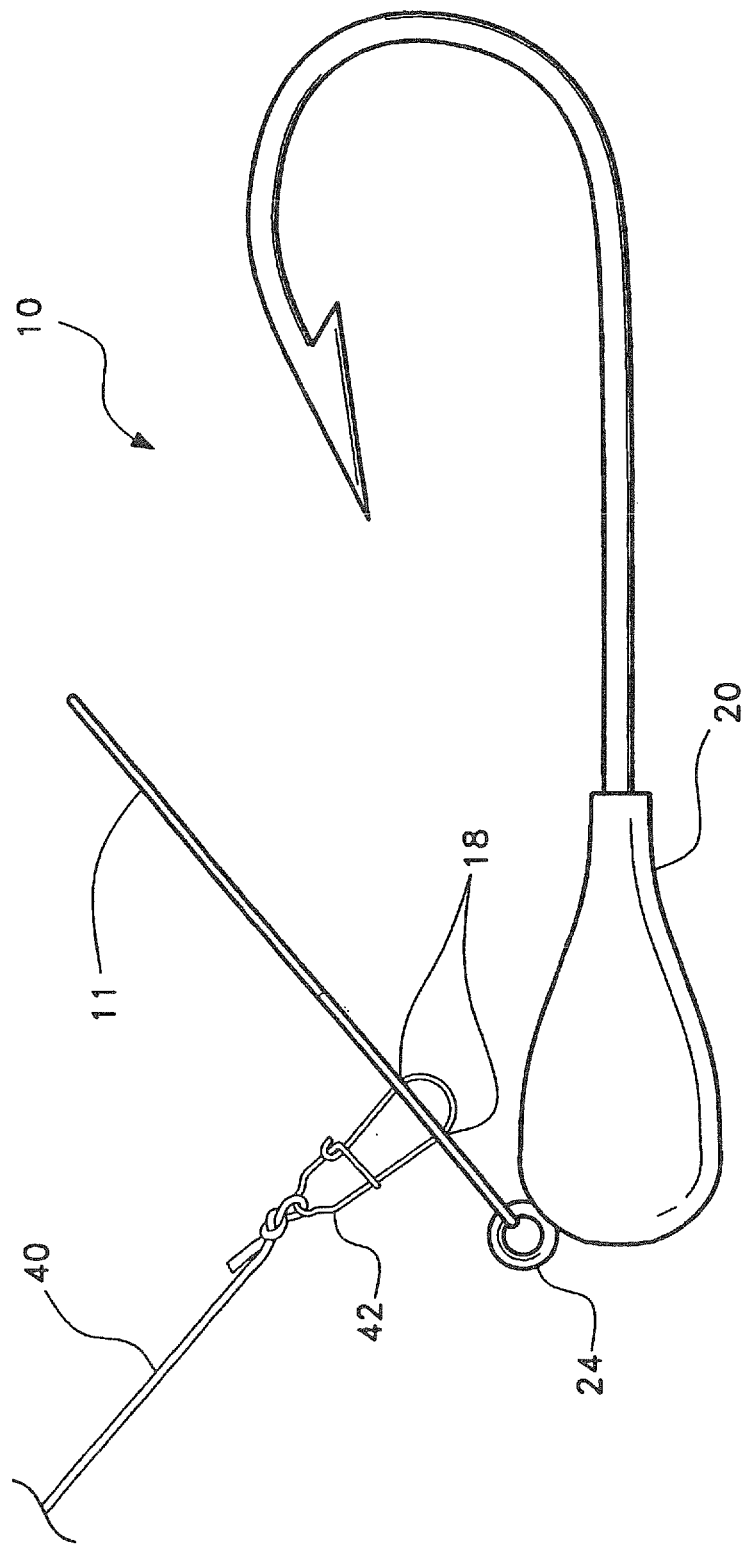
FIG. 4A is a side view of the fishing lure according to the present invention using the blade of FIG. 2A.
Figure 4B:
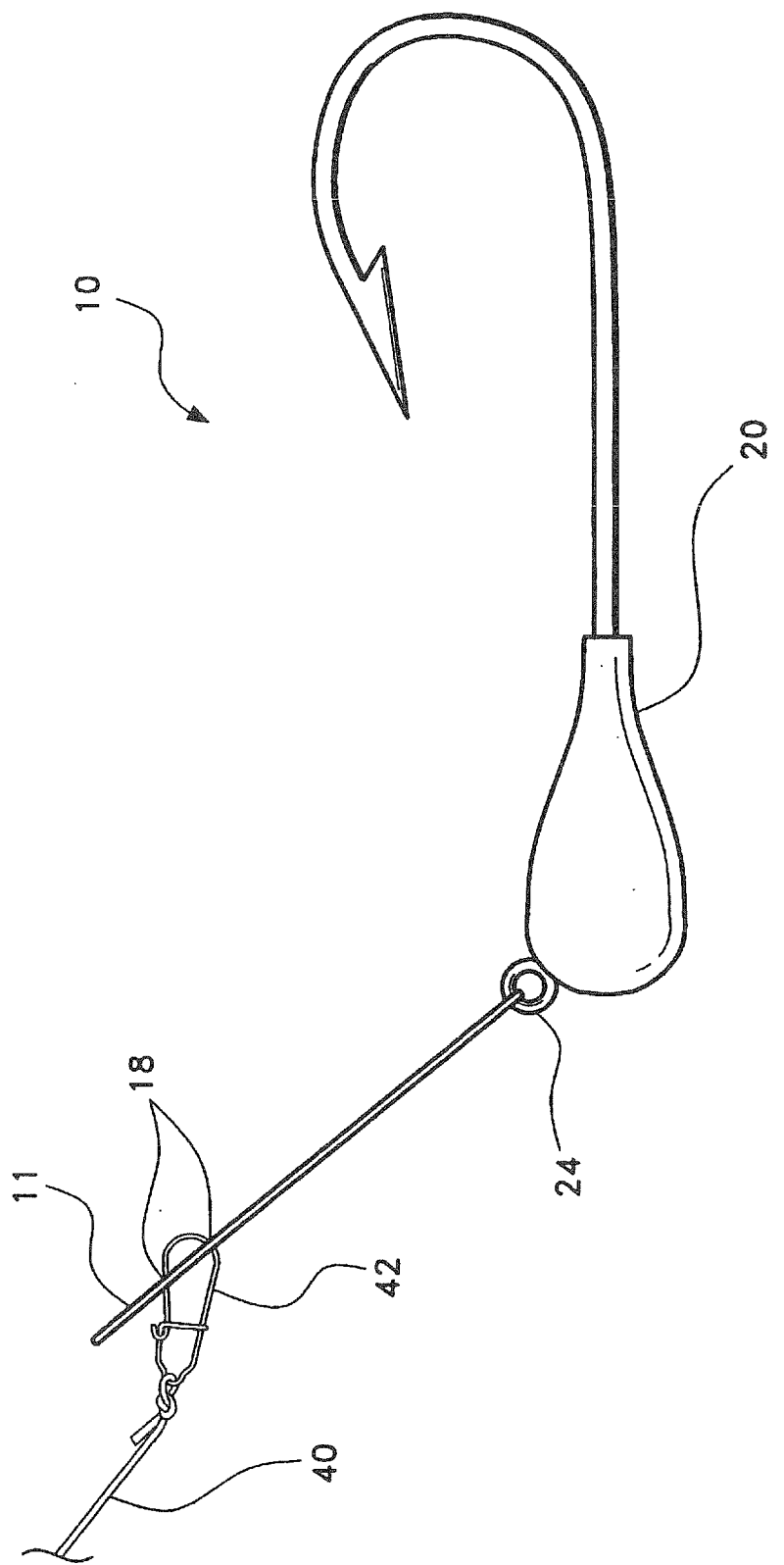
FIG. 4B is a side view of the fishing lure according to the present invention using the blade of FIG. 2B.

Turning now to FIGS. 4A and 4B, the effect on the fishing lure's 10 behavior due to the positioning of the line attachment holes 18 can be clearly seen. In FIG. 4A, the line attachment holes 18 are formed in the blade 11 near the first end 12 of the blade 11, providing a short lever-arm distance from the blade's pivot point at the eyelet 24. Because of the short lever-arm distance between the pull-point on the blade and the eyelet 24, vs. the longer lever-arm distance between the center of drag of the blade 11 (about mid-length of the blade) and the eyelet 24, the blade 11 has a tendency to be swept toward the rear of the jig 20 by water drag, as the lure 10 is pulled through the water. It can be recognized that, with the blade 11 swept back in this configuration, water is deflected upward by the blade 11 as the lure 10 moves forward, creating a tendency for the lure 10 to dive.

In FIG. 4B, the line attachment holes 18 are formed in the blade 11 away from the first end 12 of the blade 11, located at a point generally between mid-length of the blade and the second end 14 of the blade 11. With the pull point in this location, the lever-arm distance from the blade's pivot point at the eyelet 24 to the pull point is equal to or greater than the lever-arm distance between the center of drag of the blade 11 and the eyelet 24. Thus, the pulling force on the blade 11 overcomes the drag against the blade, resulting in the blade 11 being pulled ahead of the jig 20. It can be recognized that, with the blade 11 pulled ahead of the jig 20 in this configuration, water is deflected downward by the blade 11 as the lure 10 moves forward, creating a tendency for the lure 10 to run toward the water's surface.

It can be appreciated that the action of the lure 10 can be further impacted by the selection of a dressing, such as the skirt 50, which creates additional drag on the jig 20. Thus, in the configuration of FIG. 4A, described to be a "diving" configuration, the addition of a jig dressing that increases the drag of the jig 20 might change the behavior of the lure 10 to become a surface running lure, since with the added drag of the dressing there will be a greater tendency for the blade 11 to be pulled ahead of the jig 20.

Figure 5A:
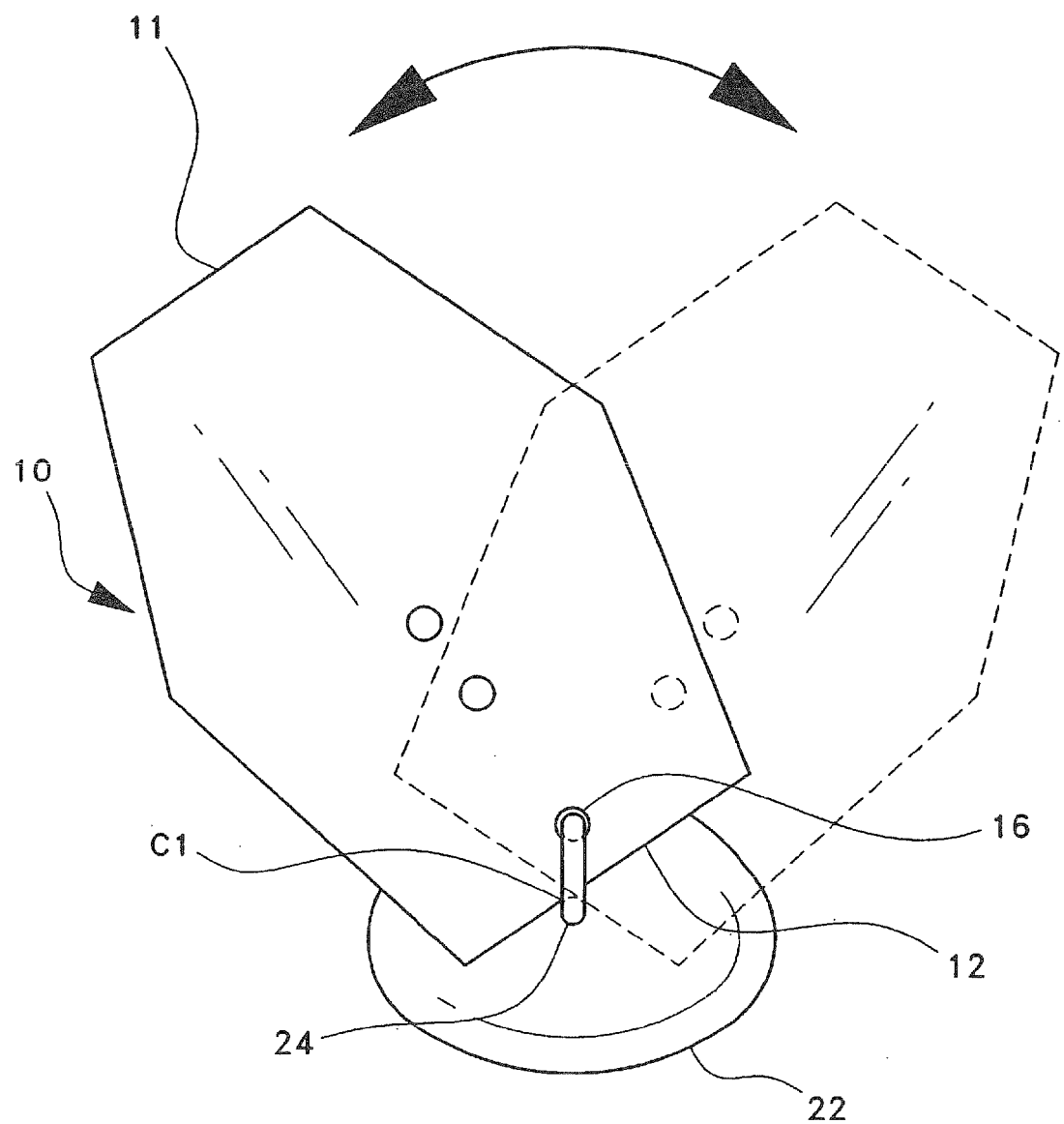
FIG. 5A is an end view of a fishing lure according to the present invention showing the range of side-to-side motion of the fishing lure's blade limited by the jig's eyelet.
Figure 5B:
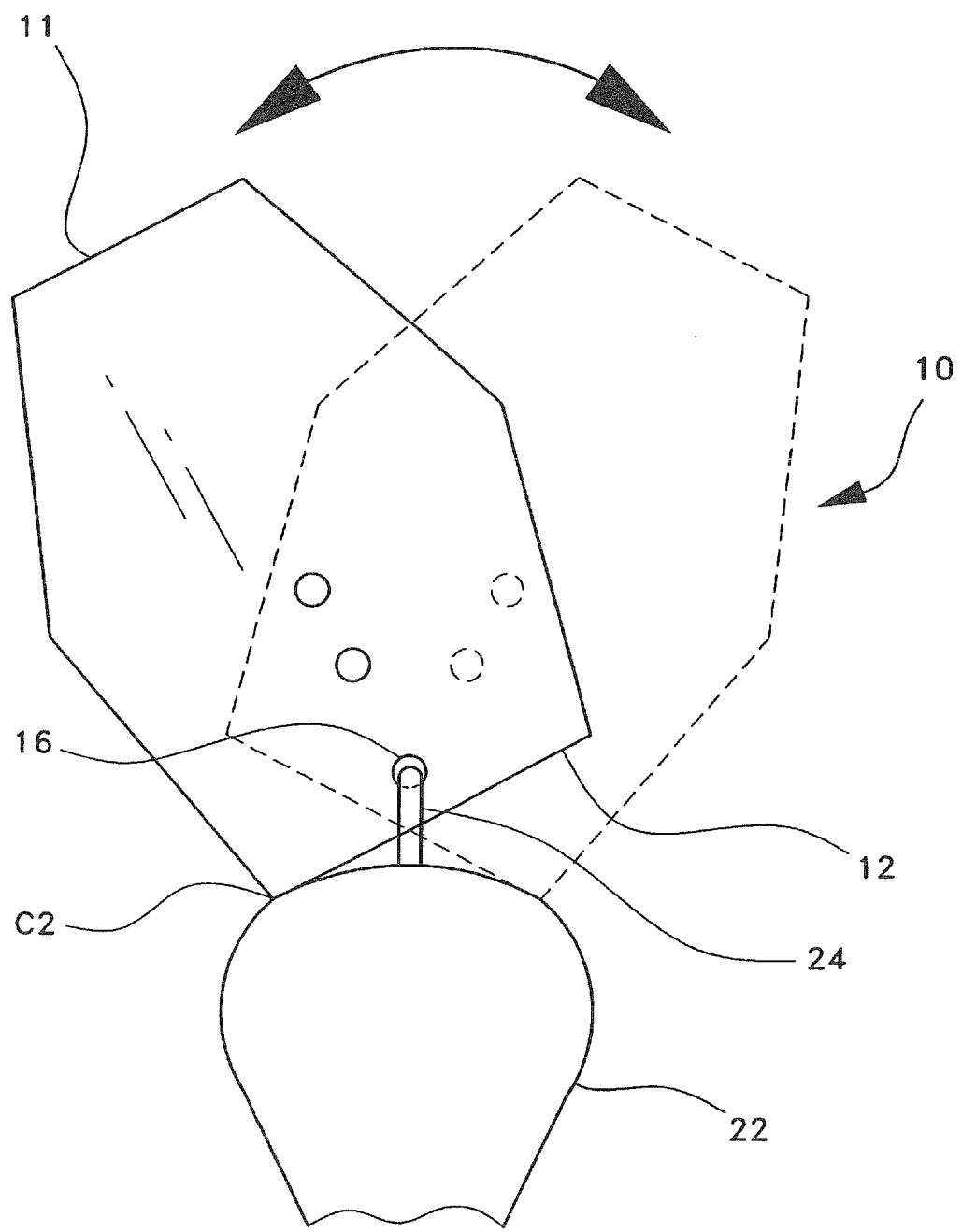
FIG. 5B is a: top view of a fishing lure according to the present invention showing the range of side-to-side motion of the fishing lure's blade limited by the jig body.

Turning now to FIGS. 5A and 5B, the fishing lure 10 produces a vibrating action, simulating the movement of small baitfish, as its movement through water displaces the blade 11 from side to side. The blade 11, hinged to the eyelet 24, is free to swing from side to side, but is limited in the range of side-to-side movement. The range of motion of the swinging blade 11 is limited as the first end 12 of the blade 11 contacts the periphery of the eyelet 24, or the jig body 22, preventing its further sideways movement.

Referring to FIG. 5A, it can be seen that, with the blade 11 oriented to avoid contact with the jig body 22, the blade 11 is limited in sideways movement by the contact of the first edge 12 with the eyelet 24, as at contact point C1. It can be recognized that the range of sideways movement is related to the proximity of the mounting hole 16 to the first end 12. With the mounting hole 16 closer to the first end 12, a greater range of sideways movement is allowed than with the mounting hole 16 set further back from the first end 12. Additionally, the size of the eyelet 24 will affect the range of sideways movement.

Referring to FIG. 5B, it can be seen that, with the blade 11 oriented so that the first end 12 contacts the jig body 22 as a result of the sideways movement of the blade 11, the blade 11 is limited in sideways movement by the contact of the first edge 12 with the jig body 22, as at contact point C2. It can be recognized that the range of sideways movement is related to the proximity of the first end 12 of the blade 11 to the jig body 22. With the first end 12 of the blade 11 closer to the jig body 22, a smaller range of sideways movement is allowed than with the first end 12 of the blade 11 mounted further away from the jig body 22. It can be understood that the proximity of the first end 12 of the blade 11 to the jig body 22 can be varied by varying the size of the eyelet 24, and by extending the eyelet from the jig body 22.

The limited range of motion of the blade 11 gives the fishing lure 10 a unique, controlled vibrating action in the water on retrieval of the lure. As the lure 10 is pulled through the water, and the blade 11 oscillates from side to side, the oscillation of the blade 11 in turn causes sideward movement of the jig 20, further imitating the movements of baitfish and small underwater creatures that are attractive to predatory fish.

The diameter of the hole 16 should be slightly larger than the diameter of the wire comprising the eyelet 24. The amount of free space remaining in the hole 16 after inserting the jig eyelet 24 should preferably be kept at a minimum, allowing for freedom of movement of the blade 11 about the eyelet 24 but not so much as to allow the lure 10 to roll over and compromise the snag-resistant tendency of the fishing lure 10, as described below. Increasing the size of the hole 16 increases the range of motion available to the blade 11.

Figure 6:
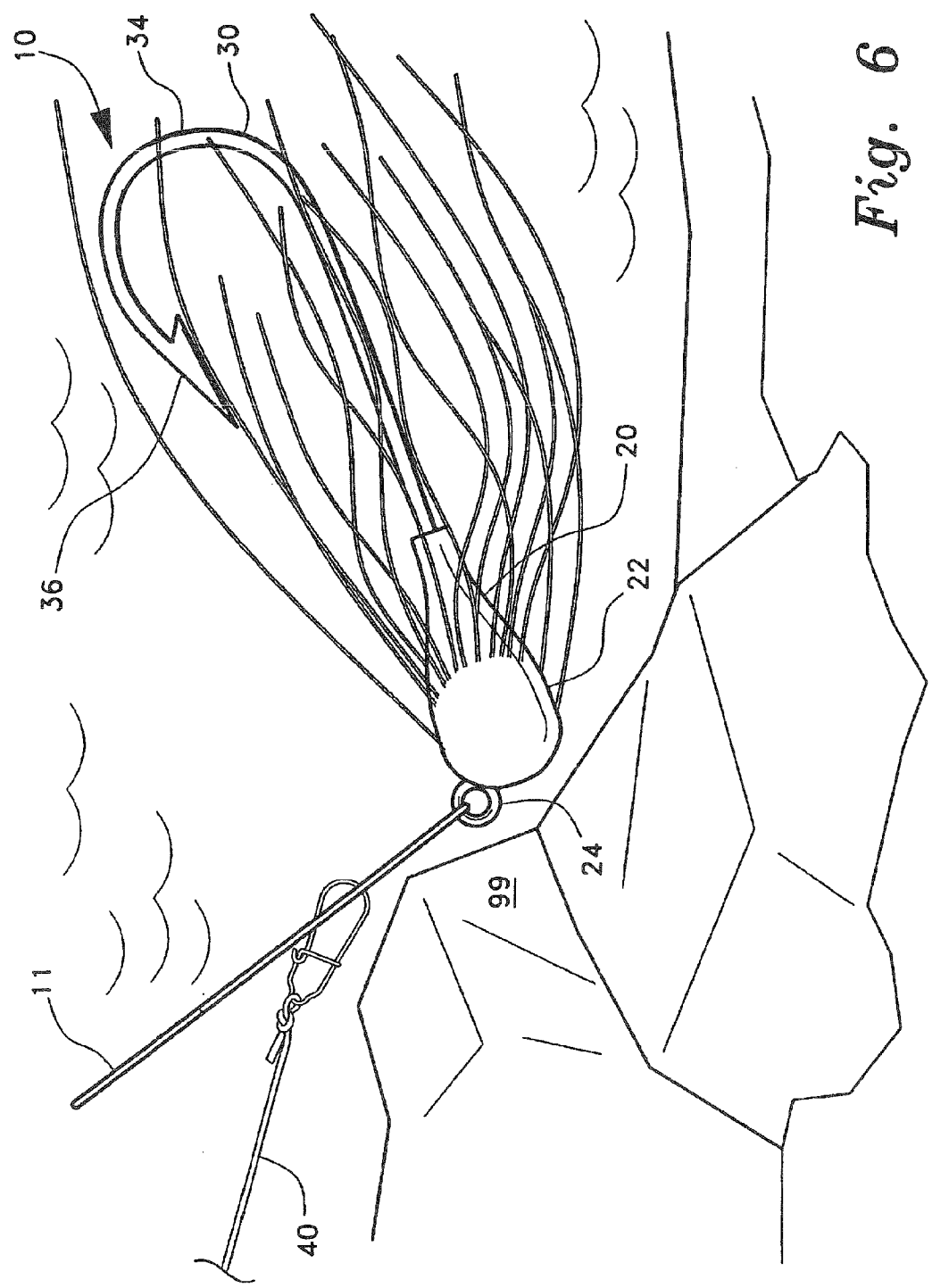
FIG. 6 is an environmental perspective view of a fishing lure according to the present invention showing the snag-resistant operation of the lure.

Turning now to FIG. 6, the snag-resistant nature of the fishing lure 10 is shown. The snag-resistant fishing lure 10 is oriented, on retrieval in the water, with the barbed point 36 of the fishhook 30 upward, toward the water's surface. The blade 11 and the eyelet 24 are also oriented upward. Given the position of the blade 11, the blade 11 acts somewhat as a natural deflector when the lure 10 encounters an obstruction 99 or potential snag.

Regardless of whether the blade 11 is configured for a diving action, with the blade 11 swept toward the rear of the jig 20, or in a surface-running configuration, with the blade 11 pulled ahead of the jig 20, the blade 11 will move ahead of the jig 20 if the jig body 22 strikes an obstruction 99. Pulled ahead of the jig body 22, the blade 11 will help to fend the lure 10 off of an obstruction 99. Additionally, as the jig body 22 strikes an obstruction 99, a continued pulling of the blade 11 by the fishing line 40 will tend to cause the hook end 34 of the fishhook 30 to tip upward, maintaining the barbed point 36 upward and away from the obstruction 99.

It can be appreciated, in this regard, that a somewhat limited degree of side-to-side movement of the blade 11 relative to the jig 20 will help to keep the jig 20 maintained in its hook-upward position, preventing the barbed point 36 from turning downward on contact with the obstruction 99 and directing the barbed point 36 towards, rather than away from, engaging the obstruction 99. Additionally, given the width of the first end of the blade 11, and its proximity to the jig body 22, the blade 11 helps to prevent the jig 20 from turning the barbed point 36 downward.

It is to be understood that the present invention is not limited to the embodiments described above, but encompasses any and all embodiments within the scope of the following claims.

I claim:

1. A fishing lure comprising:
   a hook, the hook including a shank having a first width;
   a jig body having a second width, a forward portion, and a longitudinal axis, the body secured around and encircling the shank, the first and second widths extending perpendicular to the longitudinal axis of the jig body and the second width being greater than the first width;
   a curved wire extending from the forward portion of the body; and
   a blade having a first edge located proximate the forward portion of the body and defining therethrough a mounting hole proximate the first edge, the positioning of a portion of the curved wire through the mounting hole attaching the blade to the body;
   wherein, as the lure is pulled through the water, a majority of the blade is oriented above the body and the lure exhibits a vibrating action as the blade is moved from side to side, the movement of the blade being limited by the first edge striking one of at the body or at another portion of the curved wire opposite the portion of the curved wire positioned through the mounting hole.

2. The fishing lure of claim 1, wherein the blade is generally polygonal.

3. The fishing lure of claim 2, wherein the blade defines an end opposite the first edge, the blade being bent near the end thereof.

4. The fishing lure of claim 2, wherein the blade has the shape of an elongated hexagon.

5. The fishing lure of claim 4, wherein the blade has a second edge opposite the first edge, the first edge of the blade defining a first width and the second edge defining a second width smaller than the first width.

6. The fishing lure of claim 1, wherein the blade has an arcuate edge.

7. The fishing lure of claim 1, wherein the blade further defines therethrough a pair of line attachment holes spaced apart from the mounting hole, and wherein the lure further comprises a fastener for securing a fishing line to the blade.

8. The fishing lure of claim 1, wherein the longitudinal axis is a center axis of the jig body and the shank extends rearwardly from the body along the longitudinal axis.

9. The fishing lure of claim 1, wherein the vibrating action of the blade creates an underwater acoustic wave propagation.

10. A method of producing a snag-resistant fishing lure, the method comprising:
providing a body having a forward end and a longitudinal center axis, the body further comprising a curved wire extending from the forward end and a hook extending rearwardly from the body along the longitudinal center axis, the hook having a shank, the body fixedly secured around and encircling the shank along the longitudinal center axis of the body;
providing a blade for attachment to the body, the blade having first edge proximate the body and defining therethrough a mounting hole proximate the first edge;
positioning a portion of the curved wire through the mounting hole to attach the blade to the body, such that, as the lure is retrieved, a majority of the blade is oriented above the body and the blade exhibits a side-to-side movement relative to the body: the movement being limited by the first edge striking one of at the body or at another portion of the curved wire opposite the portion of the curved wire positioned through the mounting hole.

11. The method of claim 10, wherein the body is a weighted jig body having a first width and the shank of the hook has a second width, the widths are perpendicular to the longitudinal center axis and the first width is greater than the second width.

12. The method of claim 11, wherein the hook is fixed within the body.

13. The method of claim 10, further comprising providing the blade with a polygonal shape.

14. The method of claim 13, wherein the polygonal shape is a hexagonal shape.

15. The method of claim 14, wherein the polygonal shape is an elongated hexagonal shape having the first edge as one side and a second edge opposite the first edge as another side, the first edge defining a first width and the second edge defining a second width smaller than the first width.

16. The method of claim 13, further comprising bending the blade.

17. The method of claim 10, further comprising providing the blade with a pair of line attachment holes therethrough and positioning a fastener through the line attachment holes.

18. The method of claim 10, wherein the curved wire defines a cross-sectional diameter and wherein the method further comprises providing the mounting hole in the blade slightly larger than the cross-sectional diameter of the curved wire.

19. A method of fishing, the method comprising:
securing a fishing lure to a fishing line, the fishing lure comprising a jig body; a hook, the hook having a shank with a first width and the jig body having a second width, a forward end, and a longitudinal axis wherein the first and second widths are perpendicular to the longitudinal axis and the second width is greater than the first width, wherein the jig body is immovably secured to and encircling the shank of the hook; a curved wire extending from the forward end of the body; and a blade having a first edge located proximate the body and defining therethrough a mounting hole, a portion of the curved wire being positioned through the mounting hole, the blade further having a pair of line attachment holes to which the fishing line is secured; and
pulling the lure through the water, the pulling of the lure resulting in a majority of the blade being oriented above the body and the lure exhibiting a vibrating action as the blade is moved from side to side, the movement of the blade being limited by the first edge striking one of at the body or at another portion of the curved wire opposite the portion of the curved wire positioned through the mounting hole.

20. The method of claim 19, wherein the fishing line is secured by a fastener.

\* \* \* \* \*